June 21, 1960  T. MATTHIESEN  2,941,748
FISHING REEL
Filed May 1, 1957
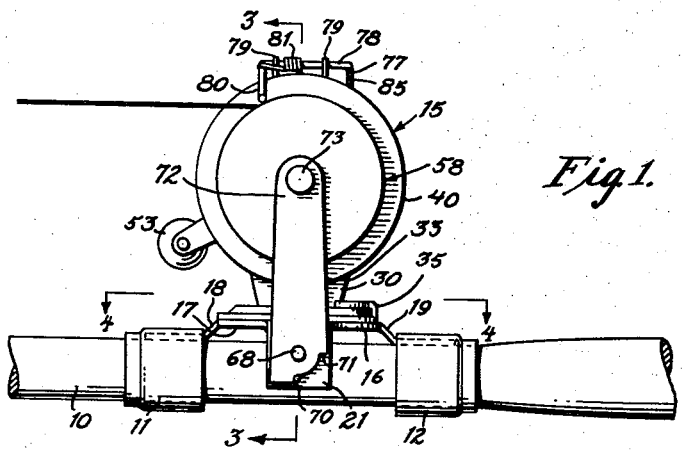
Fig. 1.
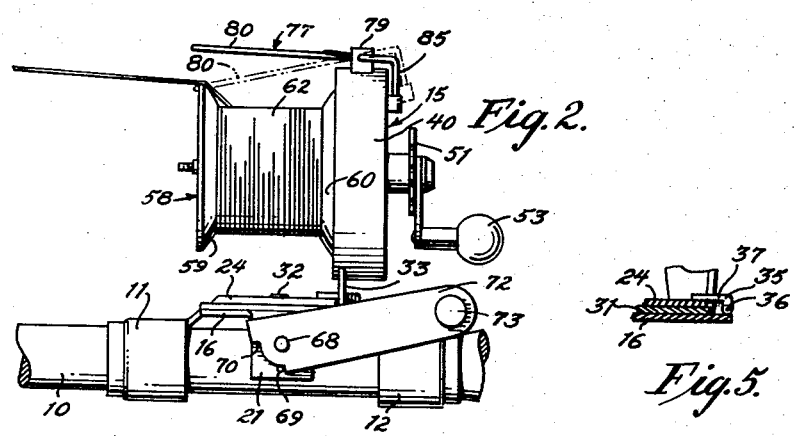
Fig. 2.
Fig. 5.
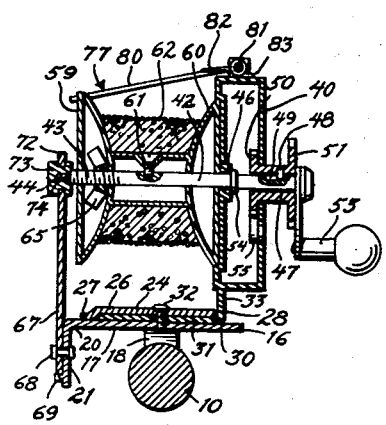
Fig. 3.
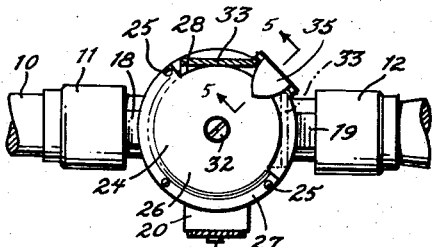
Fig. 4.
INVENTOR.
THEODORE MATTHIESEN
BY
ATTORNEYS.

United States Patent Office 2,941,748
Patented June 21, 1960

2,941,748

FISHING REEL

Theodore Matthiesen, 2916 Bay Vista, Tampa, Fla.

Filed May 1, 1957, Ser. No. 656,337

4 Claims. (Cl. 242—84.2)

This invention relates generally to fishing reels, and is especially concerned with a highly improved fishing reel of the swinging type, upon which the line can be wound and unwound in the usual manner, and wherein the line can be pulled axially from the reel without rotation thereof.

As is well known to those versed in the art of fishing, and especially in fly fishing and bait casting, it is highly advantageous that the line be removable from the reel with a minimum of resistance for satisfactory casting.

It is for this purpose that there have in the past been proposed fishing reel constructions wherein the reel has one end open or unjournaled and is swingable to extend its open end forward for generally axial removal of the line from the reel. However, these prior proposed devices have not been entirely satisfactory for various reasons, among which are their relative complexity in construction and consequent expense in manufacture, and their lack of rigidity and staunchness heretofore believed inherent in the open end type of reel.

It is therefore a general object of the present invention to provide a fishing reel of the type described which overcomes the above mentioned difficulties, is relatively simple and lightweight in construction, staunch and durable in use, and which can be manufactured and sold at a reasonable cost.

It is another object of the present invention to provide a fishing reel having the advantageous characteristics set forth in the preceding paragraph which is extremely easy and foolproof in operation, and which is quickly convertible between its normal and casting conditions.

It is a more particular object of the present invention to provide a swingable reel construction of the type described wherein novel means are provided for journaling both ends of the reel when the latter is in normal operation, while permitting one reel end to open forwardly for the casting operation.

It is another object of the present invention to provide a fishing reel of the type described which allows the quick and easy removal and replacement of line spools on the reel.

It is a further object of the present invention to provide a fishing reel of the type described which includes a novel line stopper construction for use in the casting procedure.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

Figure 1 is a side elevational view showing a fishing reel of the present invention in its normal operative condition and associated with a fishing pole;

Figure 2 is a side elevational view similar to Figure 1, but showing the fishing reel in its casting condition, and illustrating in phantom an operative position of the line stopper;

Figure 3 is a transverse sectional elevational view taken substantially along the line 3—3 of Figure 1;

Figure 4 is a horizontal sectional view taken substantially along the line 4—4 of Figure 1; and Figure 5 is a fragmentary sectional elevational view taken substantially along the line 5—5 of Figure 4.

Referring now more particularly to the drawings, and specifically to Figures 1 and 2 thereof, a fishing pole or rod is there designated 10, and may be provided with forward and rearward securing rings 11 and 12, respectively, one or both of which may be slidably circumposed about the rod.

The fishing reel is generally designated 15 and may be detachably, but fixedly secured to the rod 10 by the rings 11 and 12. More specifically, the reel 15 includes a generally circular base or plate 16 arranged generally parallel to the rod 10 and having its inner or under surface 17 facing toward the rod. A pair of opposed feet 18 and 19 project respectively forward and rearward from the base plate 16 and are adapted to rest upon longitudinally spaced regions of the pole 10. The rings 11 and 12 are respectively snuggly engageable over the feet 18 and 19 to secure the latter, and hence the reel 15, firmly on the rod 10. Provided on one side of the base plate 16, projecting laterally outward therefrom, is an integral extension 20 having its terminal portion 21 bent to extend downward or inward, substantially normal to the plane of the base plate.

A stop member or plate 24, of generally circular configuration, see Figure 4, is superposed on the base plate 16, being fixedly secured thereon by a plurality of circumferentially spaced fasteners 25. As best seen in Figure 3, the central portion 26 of the stop member or plate 24 is upset or raised, so as to be spaced above the upper or outer surface of the base plate, while the peripheral margin 27 of the stop member is secured in facing engagement with the upper surface of the base plate by the fasteners or screws 25. Further, an arcuate, marginal segment of the stop member 24 is cut away, as at 28, to provide an opening into the space between the base plate 16 and overlying stop plate 24. As best seen in Figure 4, the stop member cut-out 28 extends approximately 180° along the rear of the base plate 16 and along that side of the base plate opposite to the base plate extension or ear 20.

A bracket 30 may include a generally circular plate 31 seated on the upper or outer surface of the base plate 16 between the latter and the upset central portion 26 of the stop plate 24, and is pivotally secured therein by a pin 32 extending centrally through the stop member, bracket plate and base. Thus, the plate 31 of the bracket 30 is rotatable in the space between the base plate 16 and stop member 24 about the axis of pin 32. The bracket 30 also includes an upstanding arm 33, preferably integral with and extending from the plate 31 to the opening defined by cut-out 28 and bent to project upward, generally normal to the base plate 16. Thus, the bracket arm 33 is rotatable with the bracket plate 31, rotation of the bracket being limited by its abutting engagement with opposite end walls of the stop member cut-out 28. As best seen in Figure 4, wherein extreme opposite or limiting positions of movement of the bracket arm 33 are illustrated in full line and in dot-and-dash outline, the arm is swingable approximately one quadrant between the solid line position at one side of the base 16 and the phantom position at the rear of the base.

Adjacent to the medial region of the stop member cut-out 28 is located a hinged latch or holding plate 35 which is swingable toward and away from the outer surface of the base plate 16 into and out of its position of Figure 5 overlying the stop member 24. The latch 35 may be a tapering plate bent to right angle configuration, having its larger end hinged to a peripheral region of the base plate 16, as at 36, and having its free end portion 37 swingable into and out of a medial region in the path of movement of bracket arm 33. When the latch 35 has its free end portion 37 swung toward the base 16 into the path of bracket arm movement, the condition illustrated in Figures 4 and 5, the latch is located to abut with and prevent movement of the bracket arm 33 out of its particular extreme position of movement. That is, the latch 35 serves in its illustrated position to engage with and lock the bracket arm 33 in either of its extreme positions illustrated in Figure 4, and is swingable away from the base to permit free swinging movement of the bracket arm about its pivotal axis of pin 32.

An upstanding support 40, preferably in the form of a hollow casing or housing, is fixedly secured to and extends outward or upward from the upper end of bracket arm 33 for limited swinging movement with the bracket about the axis of pin 32, as described hereinbefore. Thus, the support 40 is swingable between its position of Figures 1 and 3 projecting upward from and on one side of the base 16, and its position of Figure 2 projecting upward from and at the rear of the base.

A spool shaft 42 is journaled for axial rotation in the support or housing 40 and has one end 43 projecting from the housing across and in spaced relation over the base 16 and stop member 24. The spool shaft 42 is thus swingable with the bracket 30 and support 40 between the position of Figures 1 and 3 extending generally laterally of the pole 10, and the position of Figure 2 wherein the shaft extends generally parallel to the pole forward toward its projecting end 43. As seen in Figure 3, the projecting shaft end 43 may be externally threaded, if desired, and a reduced longitudinal extension 44, also preferably threaded, may be formed on the projecting end of the spool shaft.

In Figure 3 it will be observed that the spool shaft 42 is journaled in a bushing 46 of the housing 40; and, the shaft is additionally journaled or rotatably supported in the housing 40 by a tube 47 circumposed about the shaft and rotatably supported in a wall of the housing. In particular, the tube 47 is slidable on the shaft 42, being constrained to limited sliding movement on the latter by a pin 48 projecting from the tube into and movable along a slot or groove 49 formed in the shaft. On one end of the tube 47, interiorly of the housing 40, is a toothed member or ratchet wheel 50, while a toothed member or star wheel 51 is provided on the other end of the tubular member 47 exteriorly of the housing 40. A handle or crank 53 is provided on the spool shaft end adjacent to and outward of the tubular member 47, and a collar 54 is formed on the spool shaft internally of the housing or support 40 adjacent to the bushing 46. Mounted in the housing or support 40 is a ratchet dog 55 for operative engagement with the ratchet wheel 50 of tubular member 47.

However, the tubular member 47 may be manually shifted inward to disengage the ratchet wheel 50 from the pawl 55 to enable the spool shaft to be freely rotated in either direction. Of course, engagement of the pawl 55 with the ratchet wheel 50 limits axial rotation of the spool shaft in one direction and imposes resistance to its rotation in that direction. It is, of course, appreciated that various other conventional drag mechanisms may be provided in the instant reel, if preferred.

A line spool 58, including rims 59 and 60, may be engaged over the projecting end portion 43 of the spool shaft 42 to locate the rim 60 adjacent to the support 40 and the rim 59 remote from the support. Any suitable means, such as a pin 61 may be inserted through the spool 58 to engage with the spool shaft 42 and prevent relative rotation between the spool and the shaft. A line 62 is illustrated as wound about the spool 58 between the rims 59 and 60.

A wing nut 65, or other suitable retaining means may be threadedly engaged about the projecting end portion 43 of the spool shaft 42 to hold the spool 58 on the shaft and prevent longitudinal shifting movement of the shaft inward toward the housing 40. Of course, the shaft collar 54 prevents longitudinal shifting of the shaft outward from the support 40.

An elongate plate, arm or post 67 has one end pivoted, as by a pin 68 to the inwardly bent ear extension 21 for swinging movement about an axis generally normal to the pole 10 and the pin 32. In addition, a stop lug or abutment member 69 is fixed to the inward extension 21, and the post 67 is configured to define shoulders 70 and 71 selectively engageable with the lug to limit rotation of the post. More specifically, the shoulder 70 is engageable with the lug 68 to limit swinging movement of the post 67 to a position with its end portion 72 extending upward or outward from the base 16 toward the projecting end 43 of the spool shaft 42 when the latter is in its laterally extending position. The shoulder 71 is engageable with the lug 69 to limit swinging movement of the post 68 rearward from its outwardly projecting position of Figure 1 to a generally rearwardly extending position, as in Figure 2. A bushing or journal member 73 is rotatably carried in the free end portion 72 of the post 67 and provided with an internally threaded hole 74 adapted for threaded reception of the spool shaft terminal portion 44, when the spool shaft is in its laterally extending condition and the post is in its outwardly projecting condition. The bushing 73 is readily removable from its engagement with the spool shaft terminus 44 by merely turning the bushing and slightly deflecting the post 67.

Mounted on the upper or outer region of the support or housing 40, for movement with the latter about the axis of pin 32 and limited rotation relative thereto, is a line stopper, generally designated 77. The line stopper may be fabricated of rod stock or wire and bent to include an intermediate portion 78 extending terminally parallel to the pole 10 and mounted for generally axial rotation by journal lugs 79 fixed on and projecting upward from the support 40. Extending from the forward end of the intermediate stopper portion 78, substantially normal to the latter, is an elongate working portion or arm 80. The working arm 80 of the line stopper 77 extends generally laterally inward, longitudinally of the spool shaft 42, and terminates at its free end proximate to the distal or remote flange 59 of the spool 58. A coil spring 81 may be circumposed about the intermediate stopper portion 78, having its opposite end portions 82 and 82 respectively engageable with the stopper arm 80 and housing 40 to resiliently urge the stopper arm downward toward its limiting position in engagement with the distal spool flange 59, as seen in solid lines in Figures 1 and 3.

On the rearward end of the intermediate stopper portion 78, extending laterally outward beyond and downward along the housing 40 is an actuating extension or arm 85. The actuating arm 85 is adapted to be manually depressed laterally inward from its dot-and-dash outline position to its solid line position in Figure 2, to remove the working arm 80 from engagement with the distal spool flange 59.

While operation of the device is believed apparent from the foregoing description, a brief outline of operating procedures may be helpful. In applying a line spool to the shaft 42, it is first necessary to unscrew the journal bearing 73 from the spool end 44 and swing the post 67 to its rearward, inoperative position of Figure 2. With the wing nut 65 removed from the threaded shaft portion 43, a spool 58 may be engaged over the open shaft end, nonrotatably connected to the shaft by a pin 61, or other suitable keying means, and the retaining nut 65 replaced on the spool shaft. For normal line reeling and unreeling operation, the housing is placed in its solid line position of Figure 4, the latch or tongue 35 swung toward the base 16 to lock the housing in position, and the post 67 swung upward to threadedly engage the bushing 73 on the terminal shaft portion 44. This is the condition illustrated in Figures 1 and 3. It will be apparent that the spool shaft 42 is well supported in this condition, being journaled at three spaced locations, namely by the bushings 73 and 46, and through the tube 47 in the outer wall of housing 40. Of course, the tube 47 is shiftable longitudinally inward to afford the shaft 42 and its spool 58 increased freedom of rotation.

In casting, it is only necessary to remove the journal member 73 from its threaded connection with the shaft end portion 44 and swing the post 67 rearward, thereby enabling the housing 40 to be swung rearward to the dot-and-dash outline position of bracket arm 33 in Figure 4 by outward swinging movement of the latch tongue 35. The latch tongue may then be returned toward the base 16 to lock the support 40 in its rearward position with the spool shaft 42 extending forward generally parallel to the pole 10. For maximum line freedom in casting, it is then only necessary to swing the pole 10 in the conventional manner and depress the actuating portion 85 of line stopper 77 for generally axial removal of the line 62 over the distal flange 59 of the spool 58. Release of the line stopper 77 to its dot-and-dash outline position of Figure 2 in engagement with the distal spool flange will serve to stop extension of the line from the spool.

From the foregoing, it is seen that the present invention provides a fishing reel of the swinging type which fully accomplishes its intended objects and is well adapted to the practical conditions of manufacture and use.

Although the present invention has been described in some detail by way of illustration and example for purposes of clarity of understanding, it is understood that certain changes and modifications may be made within the spirit of the invention and scope of the appended claims. For example, it is contemplated that the reel of the present invention may be employed in conjunction with a level wind device, a "star" drag mechanism, or other desired conventional features, without departing from the present invention.

What is claimed is:

1. A reel for mounting on a fishing pole, said reel comprising a base plate adapted to be fixed to said fishing pole with its inner surface facing toward said pole, an angle bracket seated on the outer surface of and pivoted to said base plate for swinging movement about an axis normal to the latter and having an arm projecting outward from said base plate in spaced substantial parallelism with the axis of bracket swinging movement, stop means on said plate and engageable with said bracket to limit said bracket swinging movement between a normal bracket position with said arm at one side of said base plate and a casting position with said arm at the rear of said base plate, a support projecting outward from and carried by said bracket arm for limited swinging movement with said bracket between a normal position at one side of said base plate and a casting position at the rear of said base plate, means on said base plate for releasably locking said bracket and support in a selected one of said normal and casting positions, a spool shaft axially journaled in said support and having one end projecting therefrom spaced over said base plate for swinging movement with said support between a normal position extending laterally of said pole and a forwardly extending casting position generally parallel to said pole, said shaft being adapted to removably carry a line spool for axial rotation with said shaft, a journal post pivotally connected at one end to the other side of said base plate for swinging movement about an axis extending generally parallel to said spool shaft between a normal position extending outward from said base plate and a generally rearwardly extending casting position, a journal bearing on the other end of said post detachably connectable to the projecting end of said shaft when said post and shaft are in their normal positions to rotatably support said shaft, and manually actuable spool shaft operating means connected to the other end of said shaft.

2. A reel according to claim 1, said post in its normal position being resiliently deflectable laterally outward for detachable connection to said shaft and being relatively stiff in the forward and rearward directions to resist line pull.

3. A reel according to claim 2, said journal bearing being rotatably supported by said post, and said shaft and journal bearing being threaded for detachable interengagement with each other to rotatably support said shaft.

4. A reel according to claim 2, said support including a pair of laterally spaced journal bearings rotatably supporting said shaft, said first-mentioned journal bearing and said pair of spaced journal bearings combining to define three spaced regions of journal support for said shaft.

References Cited in the file of this patent

UNITED STATES PATENTS

| | | |
|---|---|---|
| 232,733 | LeRoy | Sept. 28, 1880 |
| 744,454 | Allen | Nov. 17, 1903 |
| 1,178,159 | Holmes | Apr. 4, 1916 |
| 2,257,521 | Babcock | Sept. 30, 1941 |
| 2,477,073 | McGill | July 26, 1949 |
| 2,546,559 | Nix | Mar. 27, 1951 |
| 2,612,325 | Johnson | Sept. 30, 1952 |